2,820,779
ETHYLENE POLYMERIZATION

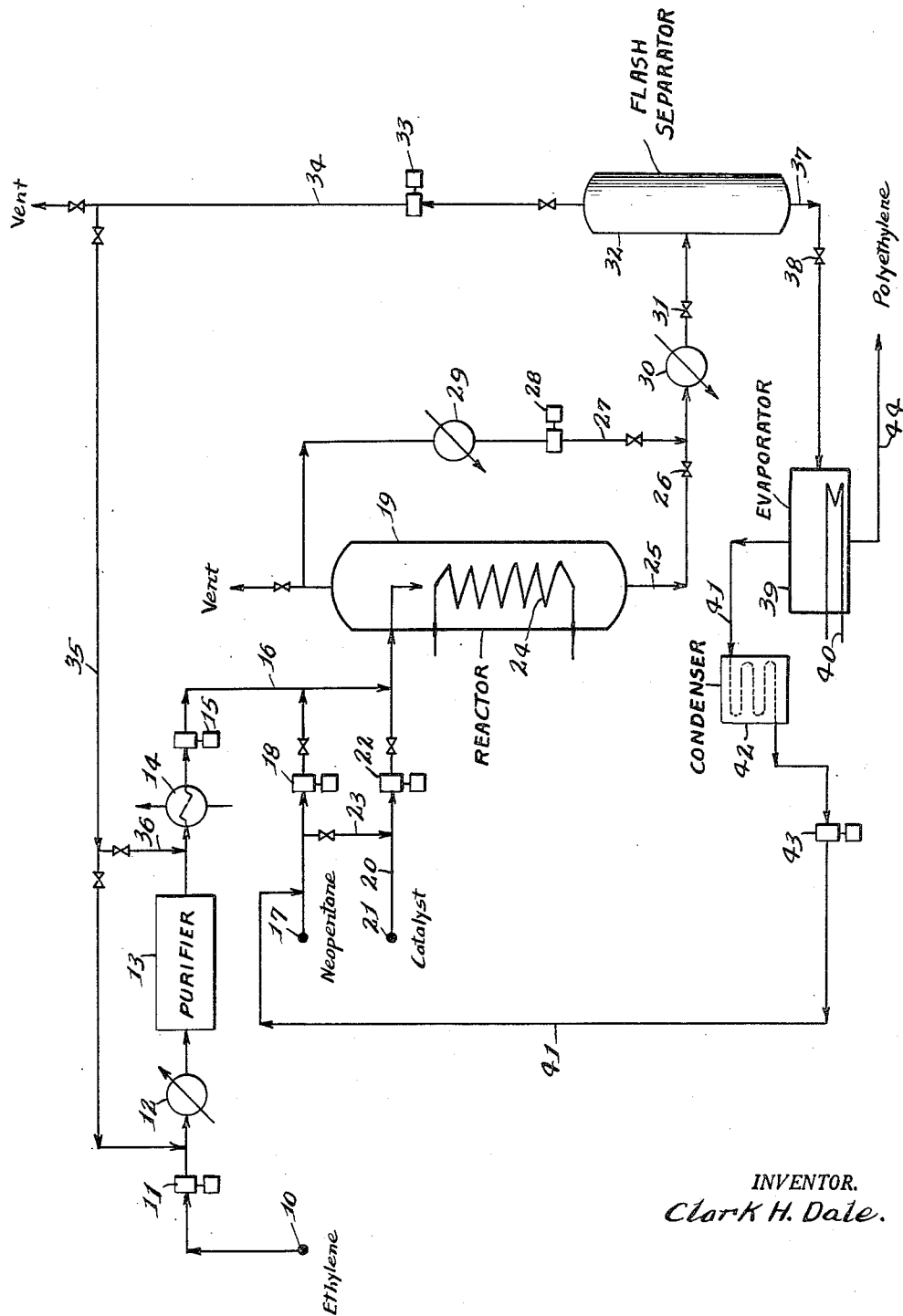

Clark H. Dale, Griffith, Ind., assignor to Standard Oil Company, Chicago, Ill., a corporation of Indiana Application November 27, 1953, Serial No. 394,542

18 Claims. (Cl. 260—94.9)

This invention relates to an improved process of polymerizing ethylene and has particular reference to a process for the preparation of normally solid polymers of ethylene. By normally solid polymers of ethylene is meant those polymers of ethylene which are capable of independent shape retention at 20° C. and atmospheric pressure. In one aspect, this invention relates to a process for the manufacture of polyethylenes having crystallization or softening temperatures above about 100° C. and specific viscosities ($\times 10^{-5}$) above about 5000, but which may extend to 15,000, 25,000, 50,000 or even more.

In the polymerization of ethylene to normally solid polymers, an important and recurrent problem has been to provide means for the removal of the solid polyethylenes from the reaction vessels, especially in processes where ethylene is subjected to continuous or flow polymerization. Various solvents or carrier liquids have been proposed for use in such processes to prevent the accumulation of difficulty removable polymer in the polymerization reaction vessels and to carry the polymer from the reaction vessels to one or more separation zones. It was found, however, that the solvent media or carrier liquids adversely affected the polymerization reaction, sometimes entering into the reaction and adversely affecting the properties of the polymer (note, for example, United States Patent No. 2,475,643). Pure water does not appear to enter into reaction with ethylene during the polymerization, but it has been found that the suspending capacity of water for normally solid polyethylenes is limited and it is difficult to attain long, continuous ethylene polymerization operations in this medium. Only a few out of many organic compounds which were tested as reaction media for ethylene polymerization have proved to be useful. Sometimes the inutility of the various organic compounds was due to undesirable physical properties, for example, relatively high melting point or very high boiling point, or tenacious retention by the solid polyethylene; sometimes it was due to undesirable chemical properties such as selective reaction with the catalyst or interaction with the growing polymer chain, and sometimes to factors which cannot be readily defined but which were reflected in decreased polymer yield, unsatisfactory suspending power for the solid polyethylenes or the like.

A primary object of the present invention is the provision of an improved process of ethylene polymerization in a liquid medium process in which an easily recovered granular polymer is produced. Another object of this invention is the provision of a novel carrier liquid for ethylene polymerization that, serving as a reaction medium, will not interfere with the course of reaction, but which also will provide a polymer having commercially suitable characteristics, particularly toughness and flexibility. A further object of the invention is the provision of a liquid reaction medium for ethylene polymerization that can be readily separated from the ethylene polymer. Yet another object of the invention is the provision of a liquid reaction medium for ethylene polymerization that can be separated from the ethylene polymer without substantial alteration of the medium, so that it can be recycled to the reaction zone. The invention has for further objects such other advantages or results as will be found in the specification and in the claims hereinafter made.

I have found that the foregoing objects can be accomplished and a suitable reaction medium or carrier liquid can be provided by supplying to an ethylene polymerization zone either prior to the introduction of ethylene or in admixture therewith, neopentane, also termed 2,2-dimethylpropane. Large proportions of neopentane, for example, 200% or more based on the weight of reactant ethylene can be employed without inhibiting the polymerization reaction. Neopentane is effectively employed in proportions between 10% and 200% by weight based on the ethylene charged and preferably between 50% and 150%. The neopentane provides a medium in which ethylene is readily polymerized in the presence of peroxide catalysts or other free-radical producing substances to form polyethylenes having tough and flexible films and a specific viscosity of well over 5,000 $\times$ $10^{-5}$; this latter value is a rough measurement of molecular weight and, sometimes, an indication of product suitability.

Neopentane has proved to be a liquid reaction medium and carrier liquid in which polyethylene forms in granules or similar small-sized, discreate shapes that can be readily separated from the remainder of the reaction mixture. If, in a continuous flow system, the polymerization is effected at temperatures well above the softening temperature of the polymer, usually from about 100–175° C., the polymer will be carried out of the reactor in the reaction medium. The polymer will then be precipitated in a granular form upon cooling. It is preferred in some instances to form the polymer at slightly below the softening temperature of the polymerized product.

A particularly surprising aspect of the invention is the fact that the use of neopentane provides an ethylene polymer of high quality in readily separable form whereas the use of its isomers, either n-pentane or isopentane, resulted in both instances in the formation of brittle, unsuitable polymer which had to be dug out of the reactor. Furthermore, the use of isopentane and normal pentane at times results in conversion values of about half that obtained from neopentane.

The fact that only the neopentane isomer of pentane provides a good product and is effective for polymer removal from the reactor suggests that neopentane is considerably more than a mere inert reaction medium or carrier liquid and exerts a positive role in guiding the polymerization or in effecting chain transfer or termination.

I prefer to employ substantially pure or concentrated neopentane, particularly anhydrous, deoxygenated neopentane. A commercially available neopentane of 99% purity is especially suitable. Small quantities, less than 5% by volume, of other liquid hydrocarbons, can be admixed with the neopentane, particularly if a modification of the product is sought and if higher pressures within the disclosed range are employed. Neopentane can be prepared by such means, for example, as the fractionation of neopentane-containing petroleum products; or by polymerizing butylene, hydrogenating the product, cracking the hydrogenated material, and fractionating the cracked product.

The use of free radical-producing substances as initiators or catalysts for the polymerization of ethylene to form normally solid polymers is well known, having been described in numerous prior Letters Patent and other publications and does not per se constitute the present invention. Among the well known ethylene polymerization catalysts of the aforesaid type, I may employ, for example, oxygen or various inorganic peroxides such as persulfate, percarbonate, perborate and perchlorate salts of ammonia, the alkali metals and the alkaline earth metals; various other inorganic peroxides, including hydrogen peroxide and various reactive metal peroxides such as zinc peroxide, manganese dioxide and the like; organic peroxides, including various diacyl peroxides such as acetyl peroxide, benzoyl peroxide, lauroyl peroxide; peroxides derived from carboxylic acids, for example, peracetic acid, persuccinic acid, their esters and the like; dialkyl peroxides such as diethylperoxide, di-tert-butyl-peroxide and the like; ketone peroxides such as diacetone peroxide, methylethyl ketone peroxide, cyclohexanone peroxide and the like; alkyl and cycloalkyl hydroperoxides such as tert-butyl hydroperoxide, tetralin peroxide, pinane hydroperoxides, alpha-alpha'-dimethylbenzyl hydroperoxide or the like; various organic nitrogen compounds which are capable of producing free radicals at temperatures between about 20 and about 300° C. at a desirable rate, including diazo compounds, derivatives of hydrazine, various azines, oximes, amine oxides, and certain azo compounds; various reactive hydrocarbon derivatives of metals such as alkyl and aryl compounds of tin, lead, the alkali metals, etc.; a miscellany of other free radical-producing substances such as the so-called "organic positive halogen compounds" (N-bromosuccinimide and the like), hexaphenylethane, hexachloroethane, etc.

Particularly desirable catalysts for employment in this invention are di-peroxydicarbonate esters having the formula

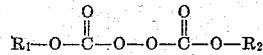

wherein $R_1$ and $R_2$ represent organic radicals, for example alkyl radicals such as methyl, ethyl, propyl, n-butyl, isobutyl, tert-butyl, amyl and the like, or different types of organic radicals (note, for example, USP 2,475,648).

Dialkyl peroxides having the formula $R_1OOR_2$, wherein $R_1$ and $R_2$ may be the same or different, are also especially desirable from the practical operating standpoint. A third class of free radical-producing substances which function extremely well as catalysts for the polymerization of ethylene to normally solid polymers are the alpha-alpha'-azo-bis-isoalkyl nitriles having the general formula

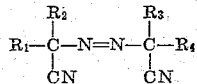

wherein $R_1$ and $R_4$ are alkyl groups and $R_2$ and $R_3$ are alkyl, cycloalkyl, or aryl groups. However, $R_1$ and $R_2$ may be linked together as a carbocyclic ring, e. g. a cyclopentyl or cyclohexyl ring, and this applies likewise to $R_3$ and $R_4$.

The concentration of free radical catalysts employed in the polymerization reaction may, in general, be varied between about 0.001 and about 1% by weight, based on the weight of the ethylene charging stock, although more or less catalyst may be used, depending upon the specific operating conditions of time, temperature and pressure, solvent concentration, etc., the specific characteristics desired in the product polymer, the desired rate of reaction, etc., as will be apparent to one skilled in the art.

The free radical-producing substance, i. e., the free radical catalyst, which is selected should be capable of decomposing at a desirable rate at a temperature within the range of about 20° C. to about 300° C. to catalyze the polymerization of ethylene to form solid polymers. Specific decomposition temperatures or temperature ranges of various free radical-producing substances have been published, for example, in C. E. Schildknecht, "Vinyl and Related Polymers" John Wiley and Sons, Inc., N. Y., 1952), page 78. The present invention is not concerned with the specific temperature ranges for use with the various free radical catalysts since these are either well known in the art or can be readily determined by one skilled in the art through routine experimentation. I prefer to employ free radical catalysts which can be used in the temperature range of about 20° C. to about 300° C., preferably about 40° C. to about 200° C.

The ethylene polymerization pressure is selected in view of the other reaction variables and of the characteristics desired in the product. In general, increasing the partial pressure of ethylene in the reaction zone tends to increase the molecular weight of the polyethylene. A generally useful polymerization pressure range is between about 500 p. s. i. and about 30,000 p. s. i., although even higher pressures may be used. The more frequently used pressure range is between about 5000 and about 15,000 p. s. i.

When a di-peroxydicarbonate ester is employed as catalyst, ethylene polymerization employing the described charging stock and neopentane as a liquid reaction medium is generally performed at temperatures between 20° C. and 100° C. and preferably between about 50° C. and 80° C., and at pressures within the range of about 500 to about 30,000 pounds and preferably between about 2,000 and 10,000 pounds per square inch gauge. Although a higher pressure can also be employed, extreme elevations in pressure have little effect on liquid phase polymerization. The organic peroxydicarbonate catalyst, which is preferably a dialkylperoxydicarbonate, is employed in amounts by weight based on ethylene of between 0.005 and about 1 percent. Depending upon the other reaction variables and upon the nature of the product desired, the polymerization period may vary from less than about one-quarter to about fifty hours. Generally, the reaction rate will not vary materially with small variations in pressure, the limiting rate apparently being the rate of solution of ethylene in the neopentane. However, if the ethylene is introduced into the reaction zone as a solution of ethylene in neopentane, increases in the partial pressure of ethylene within the disclosed range of 500 to 30,000 pounds and particularly within the range of 500 to 5,000 pounds per square inch may increase the rate of polymerization.

The dialkyl peroxides such as dimethyl, diethyl, di-n-propyl, diisopropyl, di-tertiary butyl, methyl tertiary butyl, ethyl tertiary butyl peroxides, and the like can be employed at temperatures within the range of about 60° C. to about 300° C. However, temperatures above 200° C. are employed only with the more stable members of the dialkyl peroxide series and/or at high ethylene pressures of about 15,000 p. s. i. or more.

The alpha-alpha'-azo-bis-isoalkyl nitriles, and the corresponding cycloalkyl nitriles are usually employed at temperatures within the range of about 35° C. to about 150° C. It will be understood that it is well within the skill of the art to determine the optimum specific temperatures to employ with a given catalyst and a given objective in the way of product properties.

The reaction can be performed either continuously or batchwise. Continuous reaction vessels can contain tube bundles or may be provided with other conventional cooling means. The reactors should be stainless steel or some other corrosion-resistant alloy. In a flow reactor, ethylene can be introduced in solution in neopentane or separately and be caused to flow into contact with the catalyst which can be introduced with the ethylene, neopentane or otherwise.

When reaction is completed, the resultant slurry of polymer in neopentane can be cooled to a temperature below 9.5° C., the boiling point of neopentane, and the imposed pressure can then be reduced so that unreacted ethylene can be flashed off and recycled. Alternatively, the pressure over the hot reaction product can be reduced and vaporized ethylene and neopentane can be flashed from the polymer and, preferably, be recycled. The polyethylene-neopentane slurry obtained by the first mentioned method, can either be spray-dried or the neopentane can be allowed to flash off in some other suitable manner. The product obtained is free-flowing and granular.

Reference will now be made to the accompanying figure which illustrates one embodiment of the present invention. The ethylene charging stock can be prepared by a variety of methods known in the art. Thus, ethylene may be obtained from petroleum refinery gas streams, e. g. streams derived from thermal or catalytic cracking processes, from high temperature cracking of propane, by catalytic dehydrogenation of ethane, by treatment of ethane-oxygen mixtures at high temperatures, by catalytic dehydration of ethanol and the like. The ethylene stream subjected to polymerization should be substantially free of oxygen and sulfur or their compounds, and free of nitrogen compounds. When the polymerization catalyst is not oxygen, I prefer to employ ethylene charging stocks containing 10 parts by weight per million of molecular oxygen or less. The charging stocks should contain no sulfur or nitrogen compounds and at most only small proportions of higher olefins such as propylene or butylenes. Molecular oxygen exerts a remarkable retardant effect upon other free radical-producing polymerization catalysts such as peroxydicarbonate esters, such that commercial cylinder ethylene containing in the neighborhood of 0.05 weight percent of molecular oxygen is unsuitable as a feed stock for the present polymerization process. Propylene concentrations of the order of about 0.5 weight percent in the ethylene charging stock can be tolerated when the ethylene is to be polymerized to polyethylenes having a softening point above about 100° C., but it has been observed that higher concentrations of propylene, for example, about 5 percent, or more in the ethylene charging stock, markedly reduce the softening point of the polymer which is produced by the process of the present invention. Propylene and higher olefins may be selectively removed from ethylene by adsorption, polymerization, alkylation, etc.

The charging stock employed in the process of this invention may contain saturated hydrocarbons such as ethane and propane, which exert a diluent effect by reducing the amount of ethylene in the polymerization zone, but do not exert any poisoning effect on the polymerization reaction.

As illustrated, ethylene is passed from source 10 through a pump or compressor 11 and heater 12 into a purifier indicated schematically at 13. In zone 13, oxygen, and nitrogen and sulfur-containing materials are removed from the ethylene stream. Prior art processes for the removal of small amounts of oxygen from hydrocarbon gas streams may be employed for the purpose of deoxidizing the ethylene charging stock. By way of example the ethylene may be deoxidized after being compressed to 750 p. s. i. g. and heated to about 150° C. by passage through a column packed with grains of metallic copper. An alternative method of deoxidizing comprises contacting the ethylene, under desired pressure, with an alkali metal or an alkaline earth metal, for example, molten sodium or a sodium-potassium alloy. The oxygen content of ethylene is readily reduced below 10 parts per million by contacting it with molten sodium alloys at temperatures of about 125° C. to about 150° C. over a period of about ½ to about 12 hours. Other suitable methods of oxygen removal are described in British Patent No. 560,497. It may be desirable to remove oxygen and sulfur compounds from ethylene by different methods in separate zones.

From the purifier 13, the ethylene charging stock is passed through a heat exchanger 14 wherein the ethylene is brought to a desired temperature. The heated ethylene is compressed to the selected polymerization pressure by compressor 15 and is pumped thereby through line 16 into reactor 19.

Neopentane is pumped from a source 17 to polymerization pressure and into line 16 by pump 18. As shown, the neopentane mixes with the ethylene charging stock in line 16, but the neopentane and ethylene can be separately charged to the reactor.

The polymerization catalyst is pumped through line 20 from a source 21 by a pump 22 and is delivered, preferably in solution or dispersion in neopentane, introduced through valved line 23, into the said line 20. The catalyst can also be injected into the reactor 19 dispersed in any inert liquid hydrocarbon.

In reactor 19, ethylene is polymerized. The reactor can be provided with internal cooling coil 24, through which a heat transfer medium can be circulated to aid in controlling the temperature during the exothermic ethylene polymerization reaction. The reactor can be made of stainless steel, aluminum or its alloys, or be lined with glass, silver, nickel, or tin.

The dispersion of ethylene polymer in the neopentane in the bottom of the reactor, which dispersion may be maintained by a mechanical mixing device (not shown), leaves the reactor by line 25 which may be provided with a steam jacket (not shown) although when the usual proportions of neopentane are employed, the jacket is not necessary. The dispersed polyethylene passes through a valve 26 which can be conventionally controlled by the level of liquid in the reactor.

Neopentane, polyethylene, and unreacted ethylene can be recycled through valved line 27 by pump 28 and be passed thereby through heat exchanger 29 which can aid in controlling the temperature of the exothermic polymerization.

Another portion of the dispersion of polyethylene in neopentane or even the total output of the reactor 19 can be passed through a cooler 30 in which it may be cooled to a temperature below 9.5° C., the normal boiling point of neopentane. The cooled dispersion is then flowed through valve 31, whereby the pressure is reduced to the extent that substantially the total content of unreacted ethylene will flash off the dispersion in a flash separator 32 into which it passed from the valve 31.

The separated ethylene can be recycled by pump 33 through valved lines 34 and 35 or 36 into the ethylene charging stock preferably at a point ahead of the purifier 13 so that any impurities which may have accumulated in the ethylene decomposition of catalyst in the reactor can be removed.

Polyethylene slurry leaves the separator 32 through a valved line 37, flows through valve 38 therein, and enters evaporator 39 at a considerably reduced pressure. Heat can be supplied to the evaporator by coil heater 40 or preferably by heat interchange with the cooler 30. Neopentane is separated from the neopentane-polyethylene dispersion in the evaporator 39, is flowed through line 41 and cooler or condenser 42, and is recycled by pump 43 through the line 41 to the source 17 of neopentane, and ultimately to the reactor 19.

Polyethylene can be removed by any conventional means 44 from the evaporator 39.

As an alternate manner of operation, polyethylene dispersed in neopentane can be removed from the reactor 19 and released from polymerization pressure before cooling by flowing the same through valve 26 directly into flash separator 32. Both the neopentane and unreacted ethylene will then flash from the polyethylene and the mixed vapors can be recycled by pump 33 to the reactor 19.

The following specific examples are presented to illustrate the present invention.

*Example 1*

A stainless steel bomb having 330 cc. capacity was charged with 114 grams of ethylene, 135 cc. (about 83 grams) of neopentane of 99% purity, and 0.054 cc. of diethylperoxydicarbonate. The charged bomb was heated for 4 hours at 55° C. under an average pressure of 9000 pounds per square inch gauge. The gaseous contents of the bomb were then vented to the atmosphere and were cooled at room temperature. Unreacted ethylene and neopentane evaporated from the bomb contents. A coarse granular polyethylene product remained in the reactor and this flowed freely from the bomb when it was inverted; the polyethylene, without further treatment, was substantially free of neopentane. A yield of polyethylene of 12.1 grams, representing a conversion of 10.5%, was obtained. The product had a specific viscosity of $14,600 \times 10^{-5}$ and films prepared from it were tough and flexible.

When equal weights of isopentane and ethylene were heated for 4 hours at about 55° C., in the presence of 0.0505 grams of diethylperoxydicarbonate and at an average pressure of 6700 pounds per square inch gauge, a conversion of only 5.4% was obtained. The product was difficult to remove from the reactor, was very brittle and had the unsatisfactorily low specific viscosity of $2600 \times 10^{-5}$. When the experiment was repeated at 7800 pounds per square inch gauge, using, instead of isopentane, an equal weight of normal pentane, the polymer again had to be mechanically removed from the reactor and it was found to be brittle.

Example 2

The same reactor bomb as that of Example 1 was used and to it were charged 99 grams of ethylene, an equal weight of 99% pure neopentane and 0.05%, based on the weight of ethylene charged, of diethylperoxydicarbonate. The bomb contents were heated at 55° C. for 4 hours under an average pressure of 7330 pounds per square inch gauge. The bomb was vented and the produced polyethylene, weighing 9.1 grams and being equivalent to a 9.2% conversion, was easily recovered therefrom. The polymer had a specific viscosity of $10,800 \times 10^{-5}$ and it formed tough and flexible film.

The foregoing examples illustrate particularly the advantages peculiar to neopentane in ethylene polymerization. The polymer obtained in both instances was granular in form and was easily removed from the reactor; it formed strong and flexible films and had a molecular weight of at least over 20,000 in the first case and over 15,000 in the second.

Example 3

A 180 ml. stainless steel autoclave was charged with 75 ml. of neopentane and 0.03 g. of di-tert-butylperoxide, cooled to $-100°$ C., flushed with hydrogen and evacuated, after which ethylene was condensed into the reactor in the amount of 70 g. The autoclave was placed in a rocker apparatus and heated to 149° C., affording initial ethylene pressure of 8800 p. s. i. Reaction was continued for 3 hours to convert 22 w.% of the ethylene charge into a very tough and flexible polymer having a specific viscosity $\times 10^{-5}$ of 6400, melt viscosity of $2.9 \times 10^3$ poises, and density (24/4) of 0.9234. The crystallization temperature of the polymer was found to be 105° C. by placing a sample of the polymer between glass slides, heating on a Maquenne block to obtain clear, molten polymer and cooling slowly until a haze (due to crystal formation) appeared in the melt.

In a parallel operation in which isopentane was employed as the reaction medium, a markedly inferior polymer was produced which was more difficult to remove from the reactor. In this operation the autoclave was charged with 78 ml. of isopentane, 0.03 g. of di-tert-butylperoxide and 69 g. of ethylene and reaction was effected at 149° C. for 3 hours. The initial ethylene partial pressure was 8400 p. s. i. While 22 w.% of the ethylene polymer was converted, the polymer was very brittle and had a specific viscosity $\times 10^{-5}$ which was less than 3500, a melt viscosity somewhat below 100 poises, and density (24/4) of 0.9207. The crystallization temperature of the polymer was 104° C. The markedly superior results obtained with the use of the neopentane reaction medium are readily apparent.

Example 4

The operating procedures and equipment were generally the same as in Example 3, but involved the use of alpha-alpha'-azo-bis-isobutyronitrile. The reactor was charged with 70 ml. of neopentane, 0.05 g. of the nitrile catalyst and 62 g. of ethylene. Reaction was effected at 100° C. for 3 hours, starting with an initial ethylene partial pressure of 8000 p. s. i. Of the ethylene charge, 18.6 w. percent was converted into a flexible polymer which was readily removed from the autoclave. The polymer had a specific viscosity $\times 10^{-5}$ of 4300, melt viscosity of 200 poises, and density (24/4) of 0.9306. The crystallization temperature of the polymer was 106° C.

In a parallel operation in which isopentane was employed as the reaction medium, markedly inferior results were obtained. The autoclave was charged with 75 ml. of isopentane, 0.05 g. of alpha-alpha'-azo-bis-isobutyronitrile and 70 g. of ethylene. Polymerization was effected at 100° C. for 3 hours, starting with an initial ethylene partial pressure of 8500 p. s. i. Of the ethylene charged, 16.5 w. percent was converted to a brittle polymer having a specific viscosity $\times 10^{-5}$ below 3500, melt viscosity of less than 100 poises, and $d_4^{24}$ of 0.9379. The crystallization temperature of the polymer was 112° C.

In carrying out the above examples extreme precautions were observed to obtain pure reagents and to prevent the intrusion of impurities such as oxygen, carbon dioxide, and moisture during loading of the autoclave and during reaction.

By the term "specific viscosity" I mean (relative viscosity−1), wherein relative viscosity is the ratio of the time of efflux of a solution of 0.125 g. of polymer in 100 cc. of C. P. xylenes at 110° C. from a viscosimeter to the time of efflux of 100 cc. of C. P. xylenes at the same temperature. The melt viscosity was determined by the method of Dienes and Klemm, J. Appl. Phys. 17, 458–71 (1946).

The polyethylenes produced by the process of this invention can be subjected to such after-treatment as may be selected, to fit them for particular uses or to impart desired properties. Thus the polyethylenes can be extruded, mechanically milled, or cast. Anti-oxidants, fillers, extenders, plasticizers, pigments, etc. can be incorporated in the polyethylenes.

This application is a continuation-in-part of my previous application, Serial No. 262,877, filed December 21, 1951, now abandoned.

Having thus described my invention, I claim:

1. A process which comprises passing ethylene into contact with a catalyst having the formula $$R_1-O-\overset{O}{\underset{\|}{C}}-O-O-\overset{O}{\underset{\|}{C}}-OR_2$$

wherein $R_1$ and $R_2$ are alkyl radicals and polymerizing the ethylene to form a normally solid polymer in the presence of at least 10 percent by weight, based on the ethylene charged, of a reaction medium consisting essentially of neopentane at a polymerization temperature between about 20° C. and 100° C. and at a pressure between about 500 and about 30,000 pounds per square inch gauge.

2. The process of claim 1 wherein the relative quantity of neopentane is between 10 and 200 percent based on the weight of reactant ethylene.

3. The process of claim 1 in which the catalyst is diethylperoxydicarbonate.

4. The process of claim 1 in which the catalyst is diethylperoxydicarbonate and constitutes from 0.005 to 1 percent by weight of the ethylene.

5. A process of polymerizing ethylene which comprises introducing ethylene into a reaction zone under such pressure as to maintain therein an ethylene partial pressure of between about 2000 and 30,000 pounds per square inch gauge, introducing also into said zone between 50 and 150 percent by weight, based on the ethylene, of a reaction medium consisting essentially of neopentane, effecting polymerization of the ethylene at a temperature between about 20° C. and 100° C. and in the presence of 0.005 to about 1 percent by weight, based on the ethylene, of diethylperoxydicarbonate, and obtaining a slurry of product polymer and neopentane, vaporizing neopentane, and separating it from product polymer.

6. The process of claim 5 in which the slurry is removed from the reaction zone, the pressure over the slurry is then reduced to substantially atmospheric pressure, and the neopentane contained in the slurry is flashed therefrom.

7. The process of claim 5 in which the slurry is removed from the reaction zone, is cooled to a temperature below the boiling point of the neopentane, and is thereafter released to a zone of reduced pressure, and in which process unreacted ethylene contained in the slurry is flashed therefrom in the said zone of reduced pressure and is recycled to the reaction zone.

8. A process of polymerizing ethylene which comprises introducing ethylene into a reaction zone under such pressure as to maintain therein an ethylene partial pressure betwen about 2000 and 30,000 p. s. i. g., introducing also into said zone at least about 10 percent by weight, based on the weight of the ethylene, of a reaction medium consisting essentially of neopentane, effecting polymerization of the ethylene at a temperature between about 20° and 100° C. in the presence of a catalyst having the formula

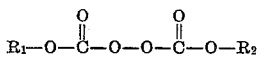

wherein $R_1$ and $R_2$ are alkyl radicals, and obtaining a slurry of product polymer and neopentane, separating the polymer, and recovering a normally solid polyethylene.

9. In a process of polymerizing ethylene wherein the ethylene is passed into contact with a catalyst having the formula

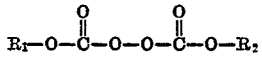

in which $R_1$ and $R_2$ are alkyl redaicals, at a temperature between about 20° and 100° C., and a pressure between about 500 and 30,000 p. s. i. g., the improvement which comprises employing with the ethylene a polymerization-reaction medium consisting of at least about 10 percent by weight of neopentane, based on the weight of the ethylene.

10. In a process for the preparation of a normally solid polymer by contacting ethylene with a free radical-producing polymerization catalyst at a suitable temperature within the range of about 20° C. to about 300° C. at which said catalyst decomposes substantially to form free radicals and at a polymerization pressure of at least about 500 p. s. i. g. and sufficiently high to induce substantial polymerization., the step of effecting said contacting in the presence of a reaction medium consisting essentially of neopentane in a proportion of at least about 10 weight percent, based on the ethylene.

11. The process of claim 10 wherein the proportion of neopentane is between about 10 and about 200 weight percent, based on the weight of ethylene.

12. The process of claim 10 wherein said catalyst is an alpha-alpha'-azo-bis-isoalkyl nitrile.

13. The process of claim 10 wherein said nitrile is alpha-alpha'-azo-bis-isobutyronitrile.

14. The process of claim 10 wherein said catalyst is an organic peroxide.

15. The process of claim 10 wherein said catalyst is a dialkyl peroxide.

16. The process of claim 15 wherein said peroxide is di-tertiary butyl peroxide.

17. The process of claim 14 wherein said peroxide is a di-peroxydicarbonate ester.

18. In a process for the preparation of a normally solid polymer by contacting ethylene with a free radical-producing polymerization catalyst selected from the group consisting of a dialkyl peroxide, a di-peroxydicarbonate ester and an alpha-alpha'-azo-bis-isoalkyl nitrile and effecting said contacting at a sutable temperature within the range of about 20° C. to about 300° C. at which said catalyst decomposes substantially to form free radicals and at a polymerization pressure of at least about 500 p. s. i. g. and sufficiently high to induce substantial polymerization, the step of effecting said contacting in the presence of a reaction medium consisting essentially of neopentane in a proportion of at least about 10 weight percent, based on the ethylene.

References Cited in the file of this patent
UNITED STATES PATENTS

| | | |
|---|---|---|
| 2,405,962 | Larson | Aug. 20, 1946 |
| 2,728,753 | Russum et al. | Dec. 27, 1955 |